(12) United States Patent
Marano

(10) Patent No.: US 12,082,553 B2
(45) Date of Patent: Sep. 10, 2024

(54) HAY FEEDER

(71) Applicant: M Club Trust dated March 28, 2018, Chicago, IL (US)

(72) Inventor: Anton T. Marano, Oak Brook, IL (US)

(73) Assignee: M Club Trust Dated March 28, 2018, Chicago, IL (US)

( * ) Notice: Subject to any disclaimer, the term of this patent is extended or adjusted under 35 U.S.C. 154(b) by 871 days.

(21) Appl. No.: 17/183,852

(22) Filed: Feb. 24, 2021

(65) Prior Publication Data
US 2021/0259202 A1    Aug. 26, 2021

Related U.S. Application Data

(60) Provisional application No. 62/981,347, filed on Feb. 25, 2020.

(51) Int. Cl.
*A01K 1/10*    (2006.01)

(52) U.S. Cl.
CPC ..................... *A01K 1/10* (2013.01)

(58) Field of Classification Search
CPC ........... A01K 1/10; A01K 5/01; A01K 5/0107
USPC ...................................... D30/131
See application file for complete search history.

(56) References Cited

U.S. PATENT DOCUMENTS

| | | | | |
|---|---|---|---|---|
| 988,599 A | * | 4/1911 | Shaw ....................... | A01K 1/10 119/60 |
| 3,362,382 A | * | 1/1968 | Frasier ..................... | A01K 1/10 119/58 |
| 3,885,524 A | * | 5/1975 | Gregory ................... | A01K 1/10 119/58 |
| 5,188,060 A | * | 2/1993 | Johnson ................... | A01K 5/01 119/58 |
| 5,909,717 A | * | 6/1999 | Randall ................ | A01K 5/0114 119/58 |
| 6,606,962 B2 | * | 8/2003 | Elliott ...................... | A01K 1/10 119/68 |
| 6,672,247 B1 | * | 1/2004 | Lienemann .............. | A01K 1/10 119/60 |
| D548,896 S | * | 8/2007 | Stewart ........................ | D30/131 |

* cited by examiner

*Primary Examiner* — Yvonne R Abbott-Lewis
(74) *Attorney, Agent, or Firm* — Bishop Diehl & Lee, Ltd.

(57) ABSTRACT

The hay feeder of the present invention includes a top bar having a first end and a second end, and a plurality of horizontally spaced vertical rods. Each vertical rod has an upper end and a lower end extending downward from the top bar. The hay feeder of the present invention also includes a bottom bar having a first end and a second end. The bottom bar attaches to the lower ends of the vertical rods. The hay feeder also includes an angle plate having a first edge and a second edge. The first edge is configured to be above the second edge such that the angle plate extends at a downward angle.

19 Claims, 5 Drawing Sheets

HAY FEEDER

RELATED APPLICATION

The present application claims the filing priority of U.S. Provisional Application No. 62/981,347, titled "HAY FEEDER," filed Feb. 25, 2020. That application is hereby incorporated by reference.

TECHNICAL FIELD OF THE INVENTION

The present application relates to a hay feeder. Particularly, the application relates to an in-stall hay feeder as well as methods of use.

BACKGROUND OF THE INVENTION

A hay feeder is a device that is used to hold hay for animals to access when they are hungry. A hay feeder is necessary for farmers and other animal care givers to provide nutrients to their animals. Previously, animals used a foraging method to satisfy their hunger. The hay feeder disclosed herein is an improvement over this early method of feeding due to its consistency and convenience.

"Fodder" is a term for food harvested and stored specifically for animal consumption. Prior to the use of fodder, farmers would commonly allow their animals to graze the land or provide them food from the plants grown on the land. However, as the type of food has evolved so have the methods of providing the food. The hay feeder has developed into a critical tool to help provide food to animals. Some problems that are common among the prior art include waste of fodder, discomfort for animals, and creation of an unsafe feeding condition.

In previous embodiments, hay feeders have been constructed to be large and free standing. While this is beneficial for feeding multiple animals at once, it does not provide a practical solution for those concerned about a single animal. It also poses a safety risk by increasing the chances that animals will fight for access to the food.

Alternatively, there have been prior devices intended to be used in a single stall. These include small baskets or trough-like feeders as well as longer feeders intended to be located in a corner. The caveat with these types of feeders is that they tend to waste a lot of food either because the animal cannot comfortably access the food inside the feeder or because the food is not kept in a sanitary location (i.e. it continuously mixes with contaminants on the ground). The disclosed device is meant to be mounted a desired height (e.g., preferably, about eight inches) above the ground to prevent the feed from continuously mixing with contaminants. It is also ergonomically constructed so the animal can have easy access to all of the food in the feeder.

These and other problems are addressed by the present device and method to provide a system with numerous advantages in operation and effectiveness. The present invention provides an improved hay feeder which effectively prevents fodder waste while being ergonomic for animals.

SUMMARY OF THE INVENTION

There is disclosed herein an improved hay feeder which avoids the disadvantages of prior devices while affording additional structural and operating advantages.

In an embodiment, the hay feeder of the present invention includes a top bar having a first end and a second end, and a plurality of horizontally spaced vertical rods. Each vertical rod has an upper end and a lower end extending downward from the top bar. The hay feeder of the present invention also includes a bottom bar having a first end and a second end. The bottom bar attaches to the lower ends of the vertical rods. The hay feeder also includes an angle plate having a first edge and a second edge. The first edge is configured to be above the second edge such that the angle plate extends at a downward angle.

These and other aspects of the invention may be understood more readily from the following description and the drawings.

BRIEF DESCRIPTION OF THE DRAWINGS AND APPENDED DOCUMENTS

For the purpose of facilitating an understanding of the subject matter sought to be protected, there are illustrated in the accompanying drawings and appendices embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figures 1, 2:
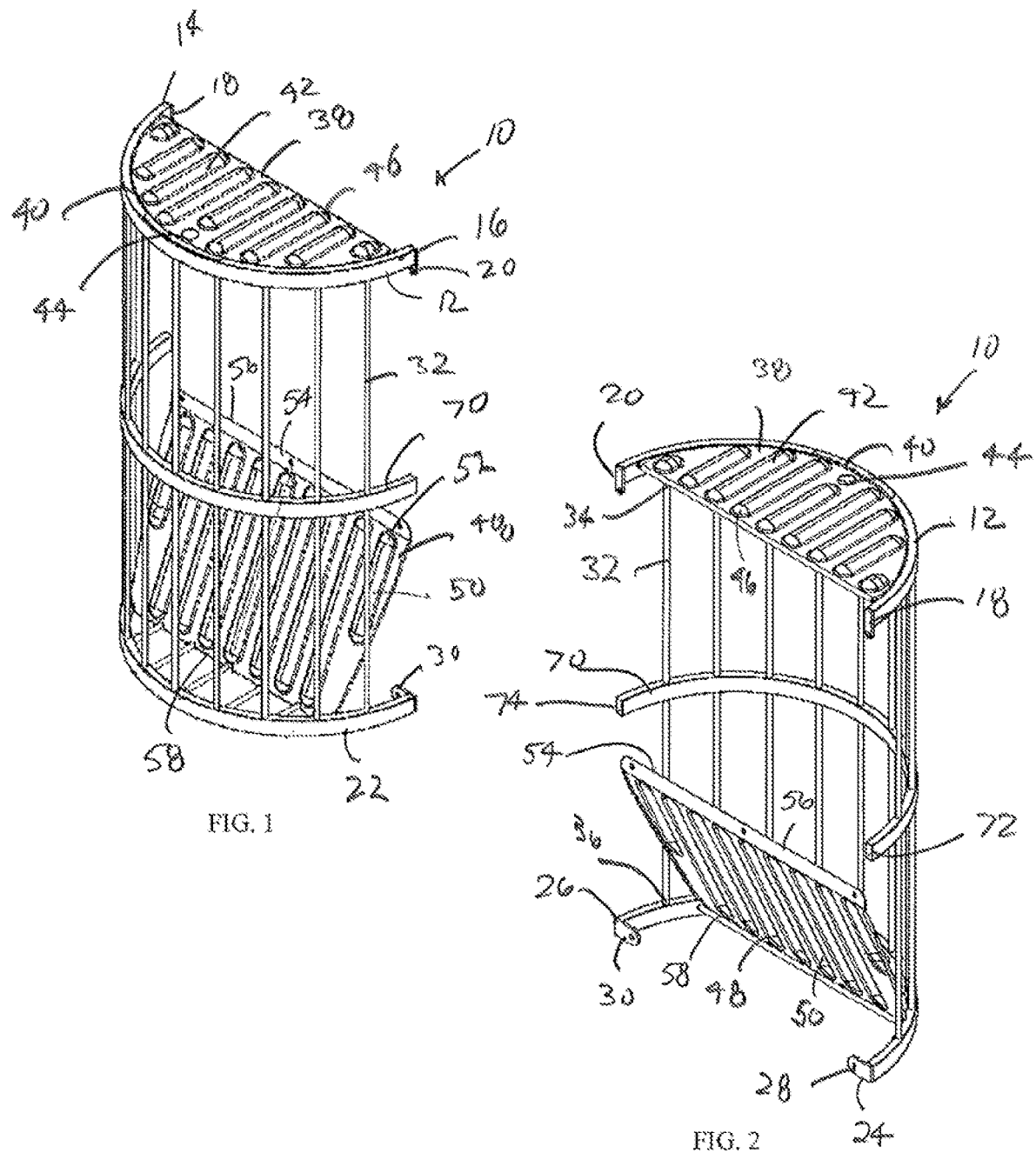
FIG. 1 is a front perspective view of an embodiment of the hay feeder of the present invention.
FIG. 2 is a rear perspective view of an embodiment of the hay feeder of the present invention.
Figure 3:
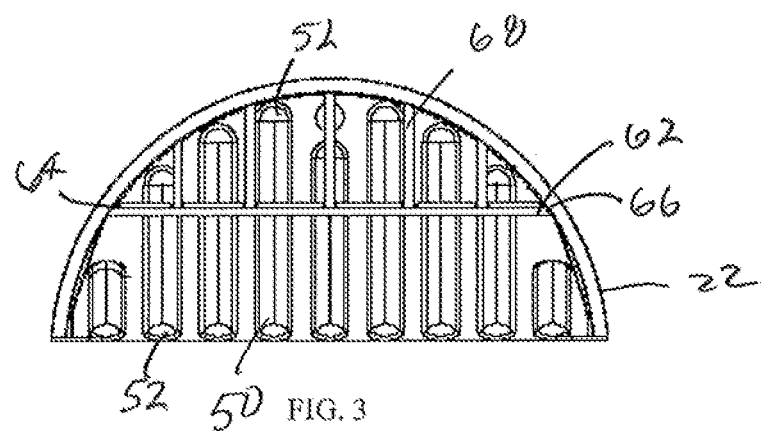
FIG. 3 is a bottom view of an embodiment of the hay feeder of the present invention.
Figure 4:
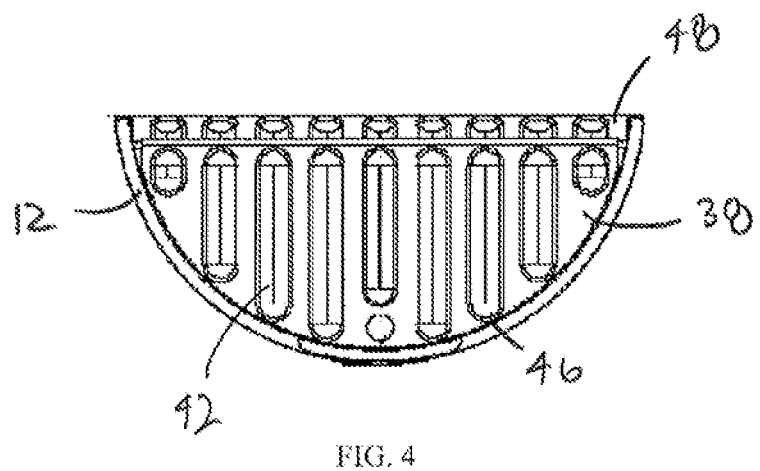
FIG. 4 is a top view of an embodiment of the hay feeder of the present invention.
Figure 5:
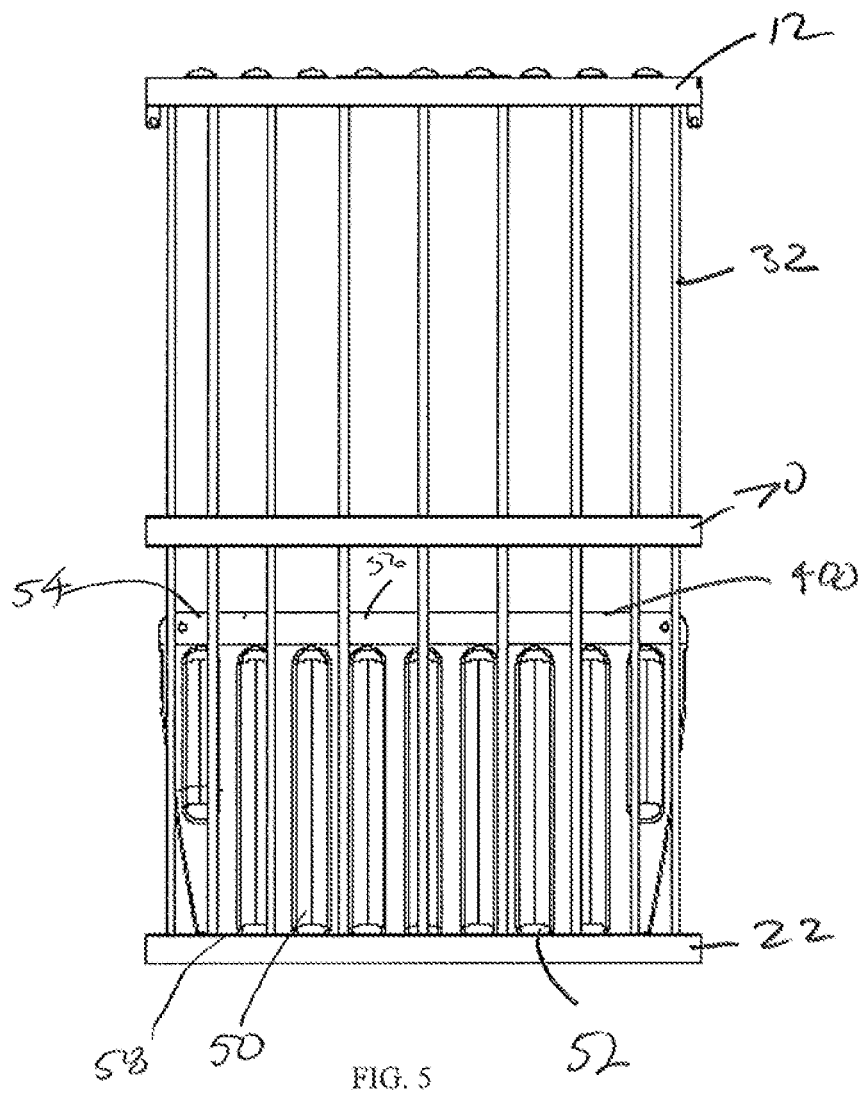
FIG. 5 is a front view of an embodiment of the hay feeder of the present invention.
Figure 6:
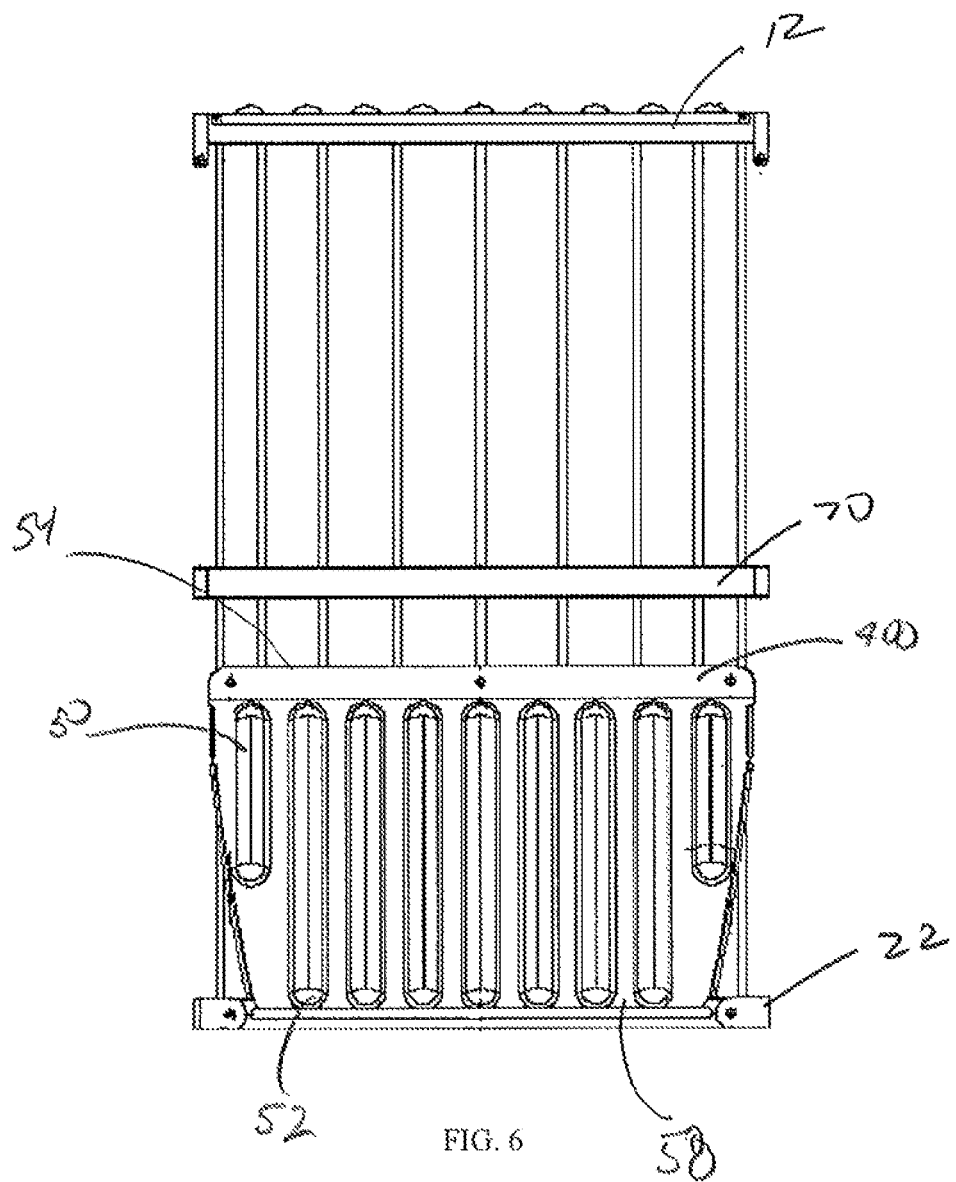
FIG. 6 is a back view of an embodiment of the hay feeder of the present invention.
Figure 7:
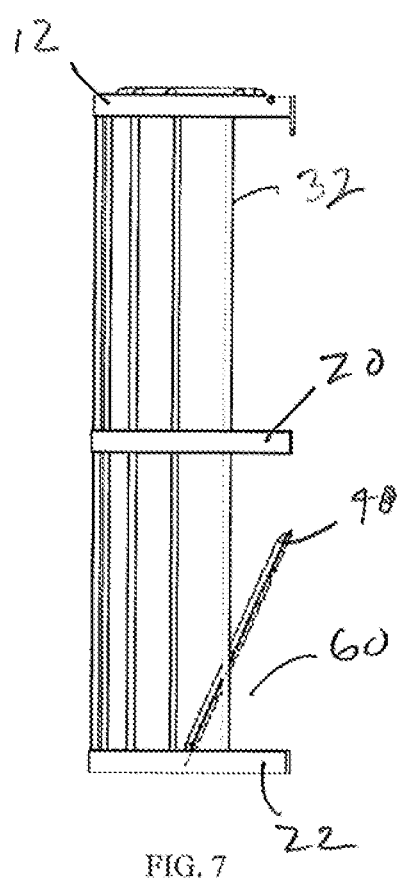
FIG. 7 is a left side side view of an embodiment of the hay feeder of the present invention.
Figure 8:
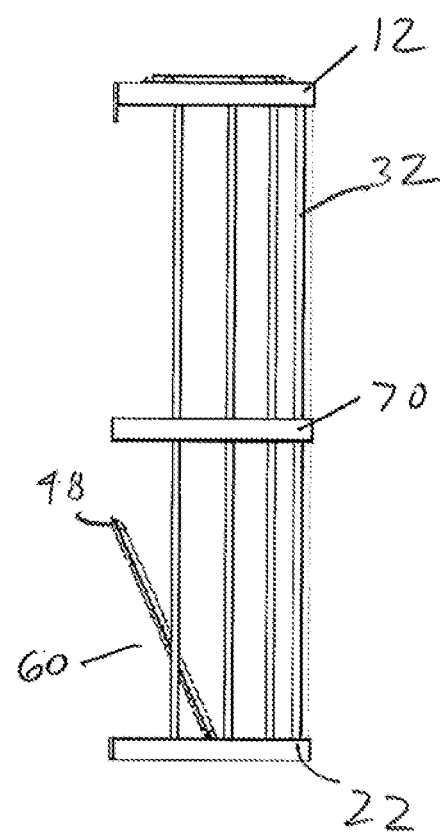
FIG. 8 is a right side view of an embodiment of the hay feeder of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

The disclosed hay feeder was designed with animal, specifically horse safety and convenience in mind. An ideal location for installation of the disclosed hay feeder is in a single stall. The disclosed embodiments can accommodate the volume of half a bale of hay at once which is enough for one horse to feed on all day. Additionally, it prevents horses from fighting over the feed and potentially causing injury to other horses.

The unit is configured to be elevated about eight inches above the ground. This keeps the bottom layer of hay clean and prevents it from growing bacteria. It also allows the horse to eat in its natural position and prevents any hoofs from being caught. If any of the feed falls to the ground the horse will still have access to eat it.

Additionally, the angle plate allows gravity to keep the food in a natural position for the horse to eat. In an embodiment the hay feeder is made from food grade stainless steel which makes it easier to clean, more durable, and more hygienic. The lid makes the hay feeder easy to load and prevents any feed from coming out of the top.

Referring now to FIGS. 1-9, there is illustrated an embodiment of the hay feeder 10 of the present invention and its numerous components. This particular embodiment of the hay feeder 10 is primarily used for feeding horses, but the hay feeder 10 can be adapted to feed cattle or other animals.

Referring to FIG. 1, there is shown a hay feeder 10 in accord with an embodiment of the present invention. The hay feed 10 comprises a top bar 12. The top bar 12 can be a solid bar, or may be a tube or other suitable configuration. In an embodiment, the top bar 12 is semicircular. the semicircular shape ensures there are no sharp edges for animals to injure themselves.

The first and second ends 14 and 16 of the top bar 12 can include brackets 18 and 20 for attaching the top bar 12 and the entire hay feeder 10 to a vertical or other backing surface (not shown) such as a wall.

The hay feeder 10 also includes a bottom bar 22. The bottom bar 22 can be a solid bar, or may be a tube or other suitable configuration. In an embodiment, the bottom bar 22 is semicircular like the top bar 12. The first and second ends 24 and 26 of the bottom bar 22 can include brackets 28 and 30 for attaching the bottom bar 22 and the entire hay feeder 10 to a vertical surface (not shown) such as a wall.

A plurality of vertical rods 32 extend between the top bar 12 and bottom bar 22. The rods 32 each have an upper end 34 and a lower end 36. In an embodiment, the upper ends 34 of the vertical rods 32 are attached to the top bar 12, and the lower ends 36 are attached to the bottom bar 22 by any suitable means such as welds. In an embodiment, the vertical rods 32 may be inserted into openings in the top bar 12 and bottom bar 22 adapted to accommodate the respective upper ends 34 and lower ends 36 of rods 32. Vertical rods 32 may be any suitable shape such as round or rectangular in cross-section. Vertical rods 32 are also spaced apart from each other to permit an animal such as a horse to access fodder such as hay within the hay feeder 10.

The hay heeder 10 also includes a lid 38. Lid 38 has an outer edge 40. The lid 38 is sized such that the outer edge 40 can be removably attached to or rest upon the top bar 12. In an embodiment where the top bar 12 is semicircular, the lid 30 is also semicircular. Lid 38 also includes a first plurality of raised portions 42 and a hole 44 for assisting in removing the lid 38. The raised portions 42 are preferably parallel and generally rectangular, and may include rounded end portions 46.

Hay feeder 10 also includes an angle plate 48 within the hay feeder 10. The angle plate 48 is preferably rectangular or trapezoidal in shape and includes a second plurality of raised portions 50. The raised portions 50 are preferably parallel and generally rectangular, and may include rounded end portions 52. The raised portions 50 assist in allowing hay or other feed to slide to the bottom of the hay feeder 10. The angle plate 48 has a bracket portion 54 along a first edge 56 for attaching the first edge 56 to the vertical backing surface. The angle plate 48 also includes a second edge 58 opposite first edge 56. The first edge 56 is preferably attached to the backing surface above the second edge 58 such that the angle plate 48 is angled downward and outward from the backing surface. The angle 60 (FIGS. 7 and 8) should be sufficient to permit hay or other fodder to slide along the angle plate 48. In a preferred embodiment the angle 60 should be in the range of 30 to 75 degrees.

In an embodiment, the hay feeder 10 includes a back rod 62 having a first end 64 and a second end 66. The first and second ends 64 and 66 of back rod 62 are attached to the bottom bar 22. A plurality of bottom rods 68 extend from the bottom bar 22 to the back rod 62 and are spaced apart to provide support for the second edge 58 of angle plate 48. The second side 58 of angle plate 48 may rest upon the bottom rods 68 or may be attached to them via any suitable means such as welding.

In another embodiment, depending perhaps on the size of the hay feeder 10, the hay feeder 10 may include a third bar 70 located between top bar 12 and bottom bar 22. The third bar 70 can be a solid bar or may be a tube or other suitable configuration. In an embodiment, the third bar 70 is semicircular like the top bar 12 and bottom bar 22. The first and second ends 72 and 74 of the bottom bar 70 can include brackets for attaching the third bar 70 and the entire hay feeder 10 to the vertical surface. In this embodiment, the plurality of vertical rods 32 comprises a first plurality of vertical rods 76 having an upper end 78 and lower end 80 extending downward from the top bar to the third bar 70 and a second plurality of vertical rods 82 having an upper end 84 and lower end 86 extending downward from the third bar 70 to the bottom bar 22. In another embodiment the vertical rods 32 may pass through openings in the third bar 70.

In operation, the lid 38 is removed and hay or other fodder is introduced into the top of the hay feeder 10. Hay then falls to the bottom of the feeder 10 and contacts the angle plate 48. The angle plate 48 continually forces the hay to the front of the feeder 10 by gravity where it is continuously and readily accessible to the animals through vertical rods 32. Once the hay feeder 10 is filled with hay, the lid 38 is placed back on the top of the feeder 10. The lid 38 helps to prevent rain or other materials from getting into the hay, as well as to prevent hay from being forced out of the feeder 10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A hay feeder, comprising:
   a top bar having a first end and a second end;
   a plurality of horizontally spaced vertical rods, each having an upper end and a lower end, the vertical rods extending downward from the top bar;
   a bottom bar having a first end and a second end, the bottom bar attaching to the lower ends of the vertical rods;
   a third bar having a first end and a second end and located between the top bar and the bottom bar; and
   an angle plate having a first edge and a second edge, the first edge configured to be above the second edge such that the angle plate extends at a downward angle toward the front of the feeder.

2. The hay feeder of claim 1 wherein the first and second ends of at least one of the top bar, third bar and bottom bar are attachable to a backing surface.

3. The hay feeder of claim 1 wherein the plurality of vertical rods comprises a first plurality of vertical rods having an upper end and a lower end extending downward from the top bar to the third bar and a second plurality of vertical rods having an upper end and a lower end extending downward from the third bar to the bottom bar.

4. The hay feeder of claim 1 further comprising a lid.

5. The hay feeder of claim 1 further comprising a back rod having a first end and a second end, the first and second ends attached to the bottom bar, and a plurality of bottom rods extending between the bottom bar and the back rod.

6. The hay feeder of claim 1 wherein the top bar comprises a semicircular tube.

7. The hay feeder of claim 1 wherein the bottom bar comprises a semicircular tube.

8. The hay feeder of claim 1 wherein the angle plate includes a plurality of parallel raised portions.

9. The hay feeder of claim 8 wherein the parallel raised portions are generally rectangular.

10. The hay feeder of claim 1 wherein the first edge of the angle plate is attachable to a backing surface.

11. The hay feeder of claim 1 wherein the downward angle is in a range between 30 and 75 degrees.

12. A hay feeder, comprising:
   a top bar having a first end and a second end;
   a plurality of horizontally spaced vertical rods, each having an upper end and a lower end, the vertical rods extending downward from the top bar;
   a bottom bar having a first end and a second end, the bottom bar attaching to the lower ends of the vertical rods;
   wherein the first and second ends of at least one of the top bar and bottom bar are attachable to a backing surface;
   an angle plate having a first edge and a second edge, wherein the first edge of the angle plate is attachable to a backing surface, the first edge configured to be above the second edge such that the angle plate extends from the backing surface at a downward angle, the angle plate also having a plurality of parallel raised portions.

13. The hay feeder of claim 12 wherein the parallel raised portions are generally rectangular.

14. The hay feeder of claim 12 wherein the parallel raised portions have rounded ends.

15. The hay feeder of claim 12 further comprising a third bar having a first end and a second end and located between the top bar and the bottom bar.

16. The hay feeder of claim 12 wherein the plurality of vertical rods comprises a first plurality of vertical rods having an upper end and a lower end extending downward from the top bar to the third bar and a second plurality of vertical rods having an upper end and a lower end extending downward from the third bar to the bottom bar.

17. The hay feeder of claim 12 wherein the downward angle is in a range between 30 and 75 degrees.

18. A hay feeder, comprising:
   a top bar having a first end and a second end;
   a plurality of horizontally spaced vertical rods, each having an upper end and a lower end, the vertical rods extending downward from the top bar;
   a bottom bar having a first end and a second end, the bottom bar attaching to the lower ends of the vertical rods;
   wherein the first and second ends of at least one of the top bar and bottom bar are attachable to a backing surface;
   an angle plate having a first edge and a second edge, wherein the first edge of the angle plate is attachable to a backing surface, the first edge configured to be above the second edge such that the angle plate extends at a downward angle from the backing surface in a range between 30 and 75 degrees, the angle plate having a plurality of generally rectangular parallel raised portions.

19. The hay feeder of claim 18 further comprising a third bar having a first end and a second end and located between the top bar and the bottom bar.

* * * * *